United States Patent
Hayes et al.

(10) Patent No.: US 10,527,002 B2
(45) Date of Patent: Jan. 7, 2020

(54) COATED THERMOPLASTIC SEAL RETAINER FOR FIRE SEAL TEST

(71) Applicant: Rohr, Inc., Chula Vista, CA (US)

(72) Inventors: Russell Brian Hayes, Escondido, CA (US); Joseph C. Zecca, San Diego, CA (US)

(73) Assignee: ROHR, INC., Chula Vista, CA (US)

( * ) Notice: Subject to any disclaimer, the term of this patent is extended or adjusted under 35 U.S.C. 154(b) by 778 days.

(21) Appl. No.: 15/185,927

(22) Filed: Jun. 17, 2016

(65) Prior Publication Data
US 2017/0362948 A1  Dec. 21, 2017

(51) Int. Cl.
| F16J 15/06 | (2006.01) |
| F02K 1/80 | (2006.01) |
| F02C 7/25 | (2006.01) |
| F16J 15/02 | (2006.01) |

(52) U.S. Cl.
CPC ............... *F02K 1/805* (2013.01); *F02C 7/25* (2013.01); *F16J 15/027* (2013.01); *F16J 15/061* (2013.01); *F05D 2260/30* (2013.01); *F05D 2300/43* (2013.01); *Y02T 50/672* (2013.01)

(58) Field of Classification Search
CPC .. F02K 1/805; F05D 2260/30; F05D 2300/43; F02C 7/25; F16J 15/027; Y02T 50/672
USPC .............. 248/205.1; 277/651, 654, 931
See application file for complete search history.

(56) References Cited

U.S. PATENT DOCUMENTS

| 4,468,043 A * | 8/1984 | Brazel | F16J 15/065 |
| | | | 277/651 |
| 5,134,046 A | 7/1992 | Chow et al. | |
| 2009/0148665 A1 * | 6/2009 | Thiagarajan | B29C 44/3446 |
| | | | 428/159 |
| 2012/0148388 A1 * | 6/2012 | Bottome | F01D 11/008 |
| | | | 415/170.1 |
| 2012/0321883 A1 * | 12/2012 | Richardson, III | B64C 1/40 |
| | | | 428/341 |
| 2015/0165666 A1 * | 6/2015 | Butcher | D02G 3/22 |
| | | | 428/373 |
| 2015/0192144 A1 * | 7/2015 | Murdock | F01D 5/323 |
| | | | 416/220 R |
| 2016/0167791 A1 * | 6/2016 | Roach | C25D 5/16 |
| | | | 219/546 |
| 2016/0221275 A1 * | 8/2016 | Pujar | C08K 3/042 |
| 2016/0305321 A1 * | 10/2016 | Pujar | B64B 1/40 |

* cited by examiner

*Primary Examiner* — Gwendolyn W Baxter
(74) *Attorney, Agent, or Firm* — Cantor Colburn LLP

(57) ABSTRACT

A seal retainer for a fire seal of a gas turbine engine is provided. The seal retainer includes a core formed from a thermoplastic material and having a shape of a seal retainer with a top surface and a bottom surface, a first layer applied to the top surface of the core, and a second layer applied to the bottom surface of the core. The first layer and the second layer are formed from a high-temperature resistant material.

11 Claims, 4 Drawing Sheets

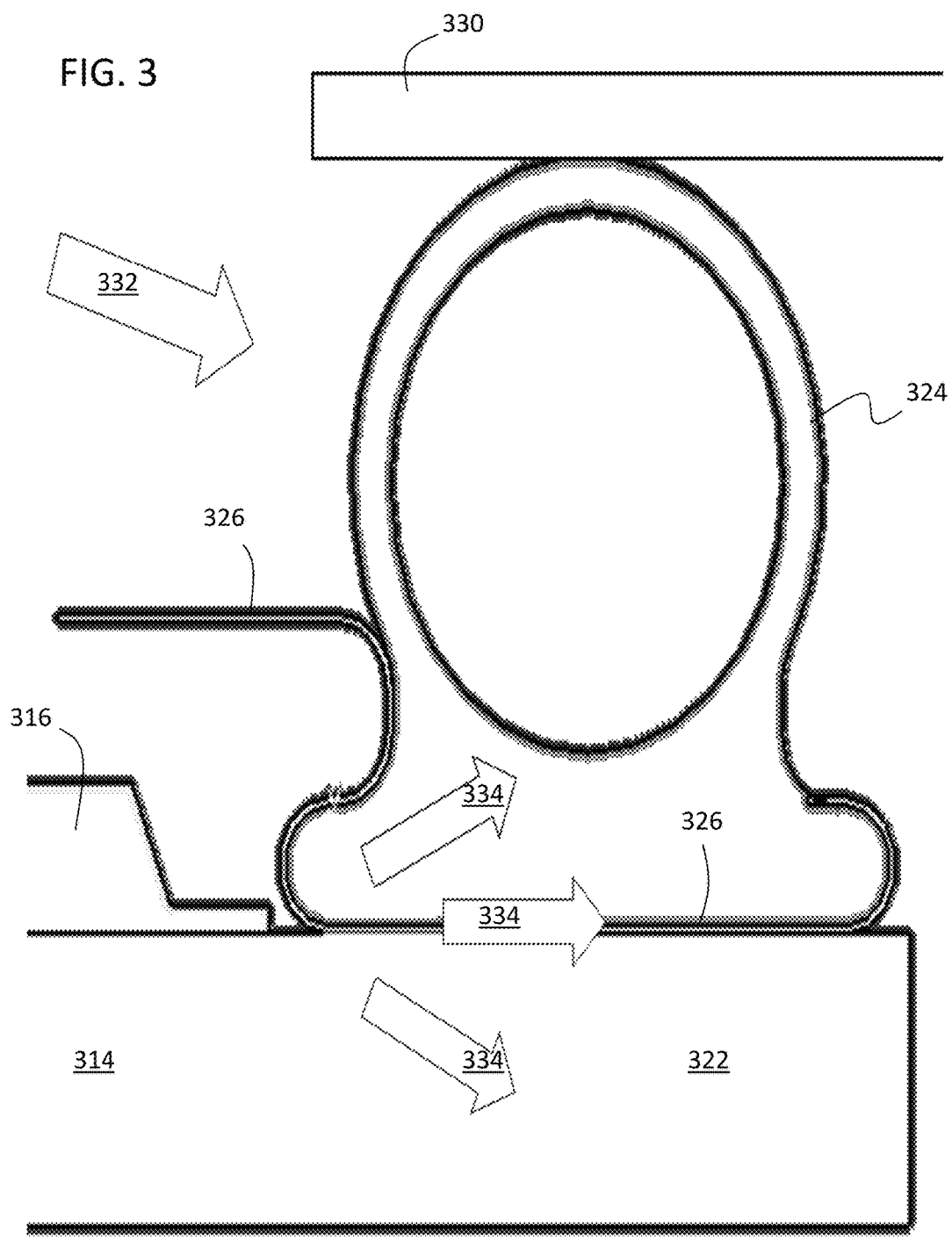

US 10,527,002 B2

COATED THERMOPLASTIC SEAL RETAINER FOR FIRE SEAL TEST

BACKGROUND

The subject matter disclosed herein generally relates to gas turbine engine components and, more particularly, to coated thermoplastic seal retainers for fire seals in gas turbine engines.

Regulatory requirements for modern aircraft require the containment of a fire within a power plant installation. For instance, if a fire is present in the engine compartment surrounding the gas turbine engine, the structures defining the engine compartment must meet certain standards related to flame resistance and fire containment. In order to meet requirements relating to fire containment, fire seals are typically used between separate adjacent components defining the engine compartment to seal between them and prevent the spread of fire. The fire seals resist the flames and the environment of the fire, and will contain the fire by not allowing the flames to pass through. Further, thermal blankets can be employed to protect panels and/or components of the gas turbine engine. Improved fire protection within gas turbine engines may be desirable.

SUMMARY

According to one embodiment, a seal retainer for a fire seal of a gas turbine engine is provided. The seal retainer includes a core formed from a thermoplastic material and having a shape of a seal retainer with a top surface and a bottom surface, a first layer applied to the top surface of the core, and a second layer applied to the bottom surface of the core. The first layer and the second layer are formed from a high-temperature resistant material.

In addition to one or more of the features described above, or as an alternative, further embodiments of the seal retainer may include that the thermoplastic material is amorphous thermoplastic polyetherimide (PEI) resin.

In addition to one or more of the features described above, or as an alternative, further embodiments of the seal retainer may include that the high-temperature resistant material is a metal.

In addition to one or more of the features described above, or as an alternative, further embodiments of the seal retainer may include that the metal is at least one of copper, nickel, gold, silver, chrome, tin, or cadmium.

In addition to one or more of the features described above, or as an alternative, further embodiments of the seal retainer may include that the high-temperature resistant material is a metallic alloy.

In addition to one or more of the features described above, or as an alternative, further embodiments of the seal retainer may include that the high-temperature resistant material is a composite material.

In addition to one or more of the features described above, or as an alternative, further embodiments of the seal retainer may include that at least one of the first layer or the second layer has a thickness of at least 0.002 inches (0.0051 cm).

In addition to one or more of the features described above, or as an alternative, further embodiments of the seal retainer may include that both the first layer and the second layer has a thickness of about 0.002 inches (0.0051 cm).

In addition to one or more of the features described above, or as an alternative, further embodiments of the seal retainer may include that the core is formed by additive manufacturing into the shape of the seal retainer.

In addition to one or more of the features described above, or as an alternative, further embodiments of the seal retainer may include that the thermoplastic is an amorphous thermoplastic.

In addition to one or more of the features described above, or as an alternative, further embodiments of the seal retainer may include that the thermoplastic is a semi-crystalline thermoplastic.

In addition to one or more of the features described above, or as an alternative, further embodiments of the seal retainer may include that the thermoplastic is at least one of acrylonitrile butadiene styrene, polycarbonate-acrylonitrile butadiene styrene, polycarbonate, polyetherimide, or polyphenylsulfone.

In addition to one or more of the features described above, or as an alternative, further embodiments of the seal retainer may include that the first layer has a first thickness and the second layer has a second thickness different from the first thickness.

In addition to one or more of the features described above, or as an alternative, further embodiments of the seal retainer may include that the first layer is formed from a first material and the second layer is formed from a second material that is different from the first material.

Technical effects of embodiments of the present disclosure include a light-weight, thermoplastic fire seal retainer with a high-temperature resistance coating applied thereto.

The foregoing features and elements may be combined in various combinations without exclusivity, unless expressly indicated otherwise. These features and elements as well as the operation thereof will become more apparent in light of the following description and the accompanying drawings. It should be understood, however, that the following description and drawings are intended to be illustrative and explanatory in nature and non-limiting.

BRIEF DESCRIPTION OF THE DRAWINGS

The subject matter is particularly pointed out and distinctly claimed at the conclusion of the specification. The foregoing and other features, and advantages of the present disclosure are apparent from the following detailed description taken in conjunction with the accompanying drawings in which:

FIG. 3 is a schematic illustration of a seal retainer configuration in accordance with an embodiment of the present disclosure;

DETAILED DESCRIPTION

Figure 1A:
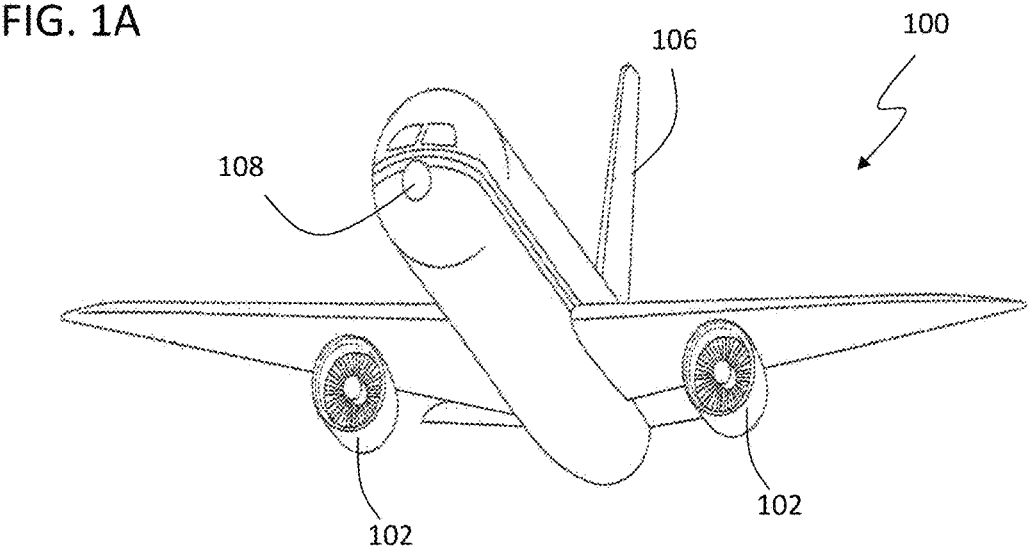
FIG. 1A is a schematic illustration of an aircraft having aircraft engines that may employ embodiments of the present disclosure.

As shown and described herein, various features of the disclosure will be presented. Various embodiments may have the same or similar features and thus the same or similar features may be labeled with the same reference numeral, but preceded by a different first number indicating the figure to which the feature is shown. Thus, for example, element "a" that is shown in FIG. X may be labeled "Xa" and a similar feature in FIG. Z may be labeled "Za." Although similar reference numbers may be used in a generic sense, various embodiments will be described and various features may include changes, alterations, modifications, etc. as will be appreciated by those of skill in the art, whether explicitly described or otherwise would be appreciated by those of skill in the art.

Figure 1B:
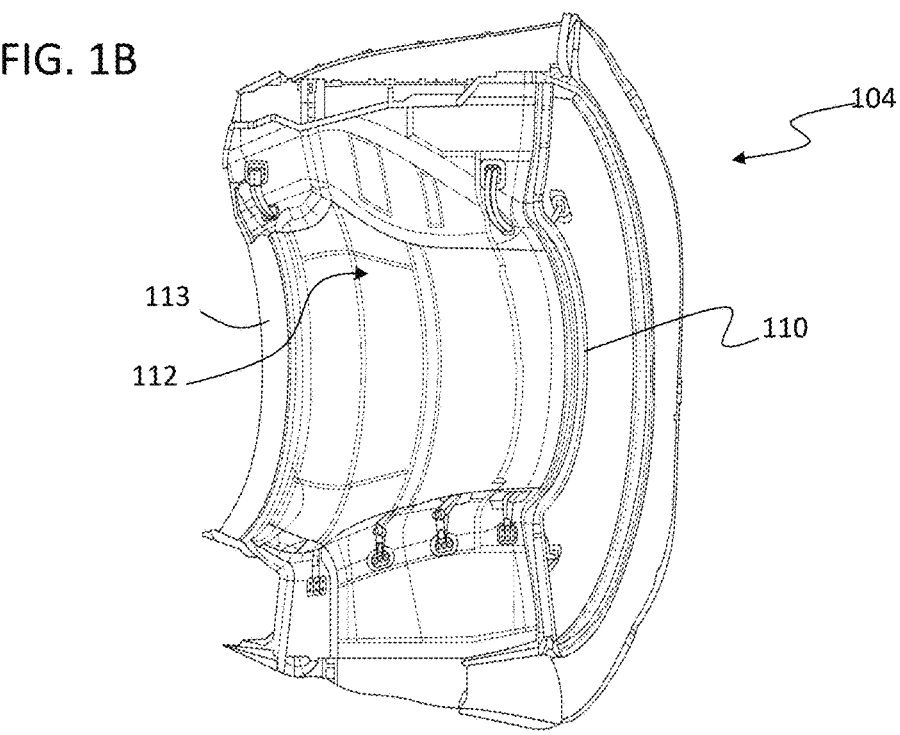
FIG. 1B is an interior schematic illustration of a portion of an aircraft engine that may employ embodiments of the present disclosure.

With reference to FIGS. 1A-1B, an aircraft 100, such as a jet or gas turbine engine aircraft, includes engines 102. The engines 102 typically include a nacelle comprising a thrust reversing structure or assembly (e.g., as shown in FIG. 1B). The nacelle surrounds and houses the turbine(s), combustor(s), compressor(s), etc. that are part of the engines 102. The thrust reversing structure or assembly can be part of a duct 104, as shown in FIGS. 1B-1B. For example, the duct 104, in some embodiments, is a C-duct pylon mounted thrust reverser of a gas turbine engine. Two ducts 104 can form a portion of the nacelle, with each duct forming about half or about 180° of the nacelle.

As used herein, "aft" refers to the direction associated with a tail 106 (e.g., the back end) of the aircraft 100, or generally, to the direction of exhaust of engines 102. As used herein, "forward" refers to the directed associated with a nose 108 (e.g., the front end) of the aircraft 100, or generally, to a direction of flight or motion.

The duct 104, as shown in FIG. 1B, has an inner fixed structure 110 that defines an area 112 therein. The area 112 may be, in some embodiments, Zone3 of a gas turbine engine, and is configured to enclose a portion of the engine 102. In some embodiments, the area 112 is a space between components of the engine and a thrust reverser. At the aft end of the duct 104 may be a structural fitting 113, such as an exhaust duct or other structure. The area 112 can be fitted with an insulating component such as a thermal blanket or other structure.

Figure 2B:
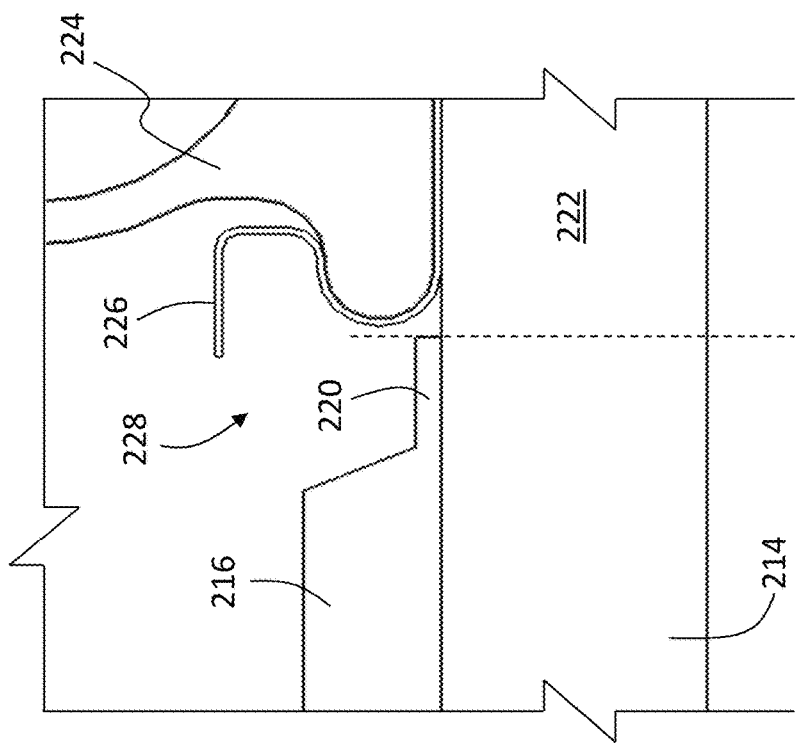
FIG. 2B is a schematic illustration of a fire seal that can be used with a panel of an aircraft engine.
Figure 2A:
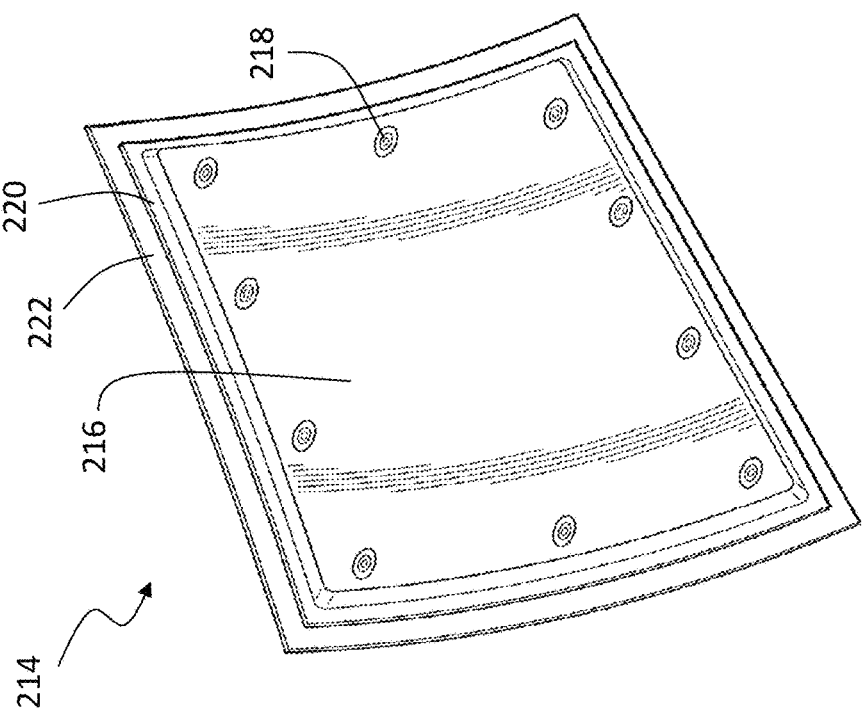
FIG. 2A is a perspective illustration of a panel of a portion of an aircraft engine that can employ one or more embodiments of the present disclosure.

For example, turning now to FIGS. 2A-2B, schematic illustration of a panel 214 having a fire seal 224 mounted thereon is shown. The panel 214 can be a bond panel for mounting a thermal blanket 216. The thermal blanket 216 can be attached to the panel 214 by bonding, and as shown, by one or more retainers 218. The retainers 218 can be snaps or other attachment devices and/or fasteners. An exterior periphery of the thermal blanket 216 includes a close-out 220. External to and surrounding the close-out 220 of the thermal blanket 216 is a seal landing 222. The seal landing 222 is a surface of the panel 214 upon which the fire seal 224 can be mounted.

As shown in FIG. 2B, the fire seal 224 is mounted to the panel 214 at the seal landing 222 within a seal retainer 226. The seal retainer 226 can be fixedly attached to the panel 214 by various attachment mechanisms including glue, adhesives, mechanical devices (e.g., screws, nails, bolts, etc.), or by other means. The fire seal 224 is configured to sealingly engage with a second seal landing (not shown) when the panel 214 is moved into a closed position (e.g., as part of an openable thrust reverser of a gas turbine engine).

The seal retainer 226 is configured to securely hold and retain the fire seal 224 about the periphery (e.g., along the seal landing 222) of the panel 214. Accordingly, the thermal blanket 216 and the fire seal 224 provide thermal protection for the panel 214. However, as shown, there is a close-out volume 228 that is formed between an edge of the thermal blanket 216 and the fire seal 224 located near the close-out 220 of the thermal blanket 216. A portion of the panel 214 is exposed to the close-out volume 228 due to the configuration of the thermal blanket 216, the close-out 220, the seal retainer 226, and the fire seal 224. As such, the seal retainer 226 must be configured and made such that it can withstand high temperatures while also maintaining the sealing achieved by the fire seal 224.

For example, referring now to FIG. 3, a schematic illustration of a fire seal configured between a panel seal landing and a component seal landing is shown. The configuration of FIG. 3 is substantially similar to that shown in FIGS. 2A-2B. A fire seal 324 is retained within a seal retainer 326 that is mounted to a panel seal landing 322 of panel 314. As shown, a thermal blanket 316 is affixed to the panel 314. Further, as shown, the fire seal 324 is configured between the panel seal landing 322 (and the seal retainer 326) and a component seal landing 330. The fire seal is configured to hold and/or maintain a delta-pressure across the fire seal 324 to prevent a backside seal ignition (e.g., on a side of the fire seal 324 opposite from the thermal blanket 316).

FIG. 3 illustrates a hypothetical flame attack 332 as it would be directed at the fire seal 324. Due to the increased temperatures during the flame attack 332, heat will be conducted into the seal 324, the seal retainer 326, and/or the panel 314/panel seal landing 322, as indicated by the arrows 334. Traditionally, the seal retainer 326 is manufactured from metals that are able to withstand the high temperatures experienced at the fire seal 324 due to the flame attack 332. However, metallic seal retainers may be relatively heavy, and in the aerospace context, reducing the weight of components is desirable. Accordingly, it may be advantageous to reduce the weight of the seal retainer without reducing the safety provided by the metallic seal retainers.

Figure 4A:
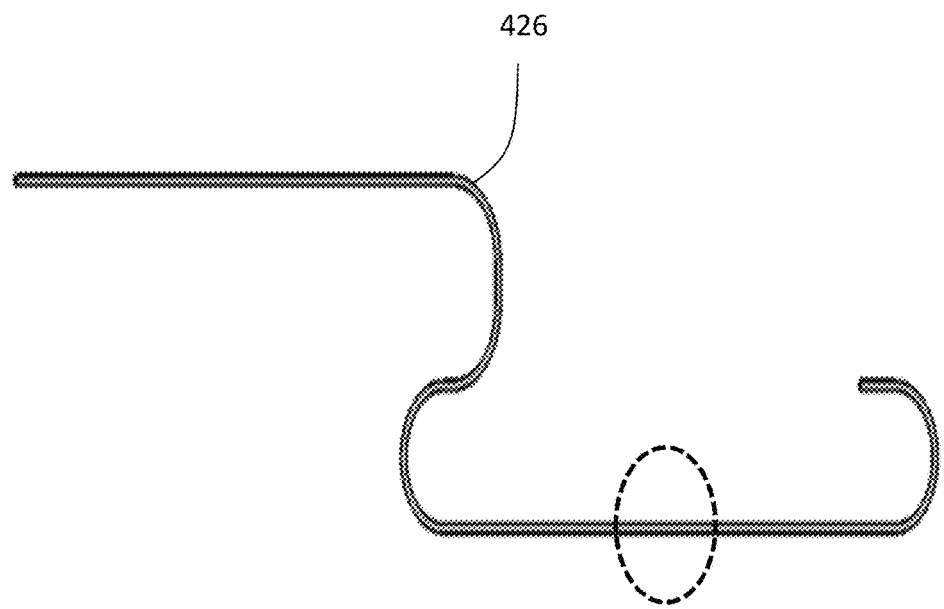
FIG. 4A is a side schematic illustration of a fire seal retainer in accordance with an embodiment of the present disclosure.
Figure 4B:
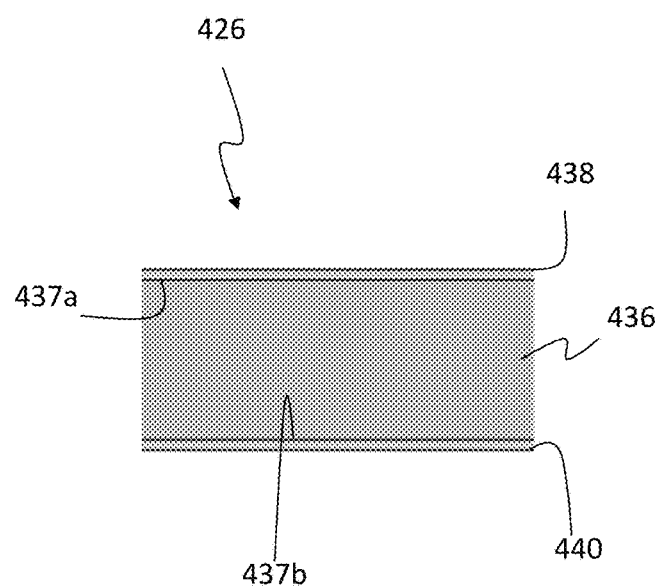
FIG. 4B is an enlarge illustration of a portion of the seal retainer of FIG. 4A.

Turning now to FIGS. 4A-4B, schematic illustrations of a seal retainer 426 in accordance with an embodiment of the present disclosure is shown. FIG. 4A illustrates a side view of the seal retainer 426 and FIG. 4B illustrates an enlarged view of the seal retainer 426 as indicated by the dashed circle of FIG. 4A. The seal retainer 426 of FIGS. 4A-4B is a layered structure with a core 436 having a first or top surface 437a and a second or bottom surface 437b. A first or top layer 438 is applied to the first surface 437a of the core 436 and a second or bottom layer 440 is applied to the second surface 437b of the core 436. That is, the seal retainer 426 is a coated structure having a core 436 with a coating (layers 438, 440) applied thereto.

As provided herein the core 436 is a thermoplastic structure that is formed into a desired shape to form a seal retainer for a fire seal of a gas turbine engine. The first and second layers 438, 440, in accordance with various embodiments of the present disclosure, are high-temperature resistant-material layers, coatings, platings, etc. that are applied to the thermoplastic core (e.g., metallic material).

In one non-limiting embodiment, the core 436 can be formed from amorphous thermoplastic polyetherimide (PEI) resin into the shape of a seal retainer for a gas turbine engine. A nickel coating can be applied to the core 436 as first and second layers 438, 440 to coat both sides of the core 436. In some embodiments, the first and second layers 438, 440 can be applied prior to shaping the core 436 into the shape of the seal retainer. In one non-limiting embodiment, each of the first layer 438 and the second layer 440 can have a thickness of about 0.002 inches (0.0051 cm) or greater, although other thicknesses and/or dimensions can be used without departing from the scope of the present disclosure (including thinner coatings/layers). Further, in some embodiments, the first layer 438 and the second layer 440 can have different thicknesses. As provided herein, because nickel has a melting point above 2000° F. (1093° C.), such a coating can provide excellent thermal protection for the thermoplastic core 436.

Accordingly, the first and second layers 438, 440 (also referred to herein as a coating) form a shell which can have a high melting point (e.g., formed from nickel) while maintaining a low weight due to the thermoplastic core 436. That is, the coating (e.g., layers 438, 440) can protect the base thermoplastic material of the core 436 from engine environments. Additionally, a coated seal retainer, as provided herein, can be lighter than a comparable metallic seal retainer. For example, embodiments provided herein can provide weight reductions as much as one-half, two-thirds, or even greater. Accordingly, in one non-limiting, example embodiment, a coated seal retainer as provided herein can weigh one-third the weight of a comparable metallic seal retainer. For example, a 6.7 inch (17 cm) section of seal retainer made from metal can weigh about 0.076 lbs. (0.034 kg) whereas a 6.7 inch (17 cm) section of seal retainer made from a coated seal retainer as provided herein can weigh about 0.028 lbs. (0.013 kg).

Advantageously, metallic-coated thermoplastic seal retainers, as provided herein, can enable unique shapes and/or configurations of seal retainers. That is, by employing thermoplastic as a base material (i.e., core 436) the seal retainer can be additively manufactured and/or printed to form complex shapes and/or geometries with precision and within a short amount of manufacturing time. Once formed, the coating/shell/metallic layers can be applied to improve the thermal characteristics of the seal retainer.

Further, advantageously, a metallic coating as provided herein can improve the rigidity of a thermoplastic core such that amorphous plastics can be used because of the increase in rigidity and structure. Moreover, the metallic coating provided by the first and second layers can protect the thermoplastic core from corrosive materials within the gas turbine engine and thus prevent dissolving of the thermoplastic due to fluids within the engine. That is, the metallic coatings provided herein add structural rigidity, heat protection, and chemical protection to the thermoplastic cores such that light-weight seal retainers can be used in gas turbine engine applications for fire seals.

Although described herein with respect to particular thermoplastics and/or metallic coatings, those of skill in the art will appreciate that other materials can be used without departing from the scope of the present disclosure. For example, the core can be formed from various thermoplastics (amorphous or semi-crystalline), composites, etc., including but not limited to acrylonitrile butadiene styrene, polycarbonate-acrylonitrile butadiene styrene, polycarbonate, polyetherimide, polyphenylsulfone, etc. Further, although described above with respect to nickel coating layers, the material of the coating layers provided herein can be selected from various metals, alloys, composites, or other materials as known in the art, including but not limited to copper, gold, silver, chrome, tin, cadmium, etc. Further, in some embodiments, one side/layer may be formed from a first material and the other side/layer can be formed from a second material that is the same or different from the first material.

Advantageously, embodiments described herein provide improved fire seals for fire seal tests can be provided. Further, advantageously, embodiments provided herein enable improved weight of fire seal retainers while maintaining high thermal properties.

The use of the terms "a," "an," "the," and similar references in the context of description (especially in the context of the following claims) are to be construed to cover both the singular and the plural, unless otherwise indicated herein or specifically contradicted by context. The modifier "about" used in connection with a quantity is inclusive of the stated value and has the meaning dictated by the context (e.g., it includes the degree of error associated with measurement of the particular quantity). All ranges disclosed herein are inclusive of the endpoints, and the endpoints are independently combinable with each other. It should be appreciated that relative positional terms such as "forward," "aft," "upper," "lower," "above," "below," and the like are with reference to normal operational attitude and should not be considered otherwise limiting.

While the present disclosure has been described in detail in connection with only a limited number of embodiments, it should be readily understood that the present disclosure is not limited to such disclosed embodiments. Rather, the present disclosure can be modified to incorporate any number of variations, alterations, substitutions, combinations, sub-combinations, or equivalent arrangements not heretofore described, but which are commensurate with the scope of the present disclosure. Additionally, while various embodiments of the present disclosure have been described, it is to be understood that aspects of the present disclosure may include only some of the described embodiments.

Accordingly, the present disclosure is not to be seen as limited by the foregoing description, but is only limited by the scope of the appended claims.

What is claimed is:

1. A panel of a thrust reverser of a gas turbine engine, comprising:
   a thermal blanket secured to the panel;
   a close-out defined by an exterior periphery of the thermal blanket;
   a seal landing defined by the panel external to and surrounding the close-out;
   a fire seal, operationally secured to the seal landing, adjacent the close-out, the fire seal including a bottom portion adjacent the seal landing that has an arcuate shape;
   a seal retainer for a fire seal secured to the seal landing, adjacent the close-out, the seal retainer comprising:
   a bottom portion adjacent the seal landing having a profile configured to matingly receive the bottom portion of the fire seal;
   the seal retainer consisting of three layers, including:
   a core formed from a thermoplastic material and defining a shape of the seal retainer;
   a first coating applied to a top of the core and disposed against the fire seal; and
   a second coating applied to a bottom of the core and disposed against the seal landing,
   wherein the first coating and the second coating are formed from a high-temperature resistant metal.

2. The panel of claim 1, wherein the thermoplastic material is amorphous thermoplastic polyetherimide (PEI) resin.

3. The panel of claim 1, wherein the metal is at least one of nickel, copper, gold, silver, chrome, tin, and cadmium.

4. The panel of claim 1, wherein at least one of the first coating and the second coating has a thickness of at least 0.002 inches.

5. The panel of claim 4, wherein both the first coating and the second coating has a thickness of about 0.002 inches.

6. The panel of claim 1, wherein the core is formed by additive manufacturing into the shape of the seal retainer.

7. The panel of claim 1, wherein the thermoplastic is an amorphous thermoplastic.

8. The panel of claim 1, wherein the thermoplastic is a semi-crystalline thermoplastic.

9. The panel of claim 1, wherein the thermoplastic is at least one of acrylonitrile butadiene styrene, polycarbonate-acrylonitrile butadiene styrene, polycarbonate, polyetherimide, and polyphenylsulfone.

10. The panel of claim 1, wherein the first coating has a first thickness and the second coating has a second thickness different from the first thickness.

11. The panel of claim 1, wherein the first coating is formed from a first material and the second coating is formed from a second material that is different from the first material.

* * * * *